(12) United States Patent
Christensen (10) Patent No.: US 7,759,815 B2
(45) Date of Patent: Jul. 20, 2010

(54) WIND MOTOR WITH A HOLDING DEVICE FOR A ROTOR SHAFT

(75) Inventor: Michael Christensen, Viborg (DK)

(73) Assignee: Nordex Energy GmbH, Norderstedt (DE)

( * ) Notice: Subject to any disclaimer, the term of this patent is extended or adjusted under 35 U.S.C. 154(b) by 382 days.

(21) Appl. No.: 11/721,844

(22) PCT Filed: Nov. 25, 2005

(86) PCT No.: PCT/EP2005/012620
§ 371 (c)(1),
(2), (4) Date: Oct. 9, 2007

(87) PCT Pub. No.: WO2006/066686
PCT Pub. Date: Jun. 29, 2006

(65) Prior Publication Data
US 2009/0261594 A1   Oct. 22, 2009

(30) Foreign Application Priority Data
Dec. 17, 2004   (DE) ................ 10 2004 060 770

(51) Int. Cl.
| H02P 9/04 | (2006.01) |
|---|---|
| F03D 9/00 | (2006.01) |
| F16C 23/04 | (2006.01) |
| F16C 23/08 | (2006.01) |
| F16C 25/04 | (2006.01) |
| F03B 15/06 | (2006.01) |
| F03B 11/00 | (2006.01) |
| F03B 11/02 | (2006.01) |
| F03B 9/00 | (2006.01) |
| F03D 7/00 | (2006.01) |
| F03D 11/00 | (2006.01) |
| F03D 5/02 | (2006.01) |
| F03D 11/04 | (2006.01) |
| F01D 25/26 | (2006.01) |
| F01D 25/28 | (2006.01) |
| F01D 25/24 | (2006.01) |
| F01D 23/00 | (2006.01) |
| F04D 29/60 | (2006.01) |
| F04D 29/40 | (2006.01) |
| B63H 1/34 | (2006.01) |

(52) U.S. Cl. .................... 290/55; 290/44; 384/198; 415/2.1; 415/4.1; 415/213.1; 415/214.1; 416/7; 416/132 B; 416/244 A; 416/244 R (58) Field of Classification Search ............... 290/44, 290/55; 318/198; 415/2.1, 4.1, 4.2, 4.3, 415/4.5, 213.1, 214.1; 416/7, 132 B, 244 A, 416/244 R
See application file for complete search history.

(56) References Cited

U.S. PATENT DOCUMENTS 423,408 A * 3/1890 Benjamin ............... 384/198

(Continued)

FOREIGN PATENT DOCUMENTS

EP   1 045 139 A2   4/2000

(Continued)

*Primary Examiner*—T C Patel
*Assistant Examiner*—Pedro J Cuevas
(74) *Attorney, Agent, or Firm*—Vidas, Arrett & Steinkraus (57) ABSTRACT

Wind motor with a drive, the input of which is coupled with a rotor shaft, which has a separate mount, characterized in that a holding device is provided between the mount and the drive, which in its mounted state holds the rotor shaft in a predetermined position.

6 Claims, 9 Drawing Sheets

U.S. PATENT DOCUMENTS

| | | | | |
|---|---|---|---|---|
| 2,018,474 A * | 10/1935 | Tholl | | 210/366 |
| 2,177,934 A * | 10/1939 | Britton et al. | | 280/124.136 |
| 2,854,297 A * | 9/1958 | Scott et al. | | 384/198 |
| 2,942,445 A * | 6/1960 | Burkland | | 68/23.3 |
| 2,947,893 A * | 8/1960 | Bussone | | 310/90 |
| 2,991,659 A * | 7/1961 | Bowden | | 74/5.6 D |
| 3,038,765 A * | 6/1962 | Tupper | | 384/425 |
| 3,573,510 A * | 4/1971 | Otto | | 384/412 |
| 3,789,251 A * | 1/1974 | King | | 310/239 |
| 4,008,928 A * | 2/1977 | Abel | | 384/207 |
| 4,084,861 A * | 4/1978 | Greenberg et al. | | 384/99 |
| 4,141,605 A * | 2/1979 | Riordan et al. | | 384/223 |
| 4,213,661 A * | 7/1980 | Marmol | | 384/99 |
| 4,245,870 A * | 1/1981 | Punshon et al. | | 384/247 |
| 4,289,970 A * | 9/1981 | Deibert | | 290/44 |
| 4,293,170 A * | 10/1981 | Brezosky | | 384/275 |
| 4,309,062 A * | 1/1982 | Bischoff | | 384/205 |
| 4,428,710 A * | 1/1984 | Grisebach et al. | | 414/590 |
| 4,456,845 A * | 6/1984 | Cunningham | | 310/90 |
| 4,533,260 A * | 8/1985 | Andrieux | | 384/260 |
| 4,598,220 A * | 7/1986 | Stone | | 310/90 |
| 4,711,590 A * | 12/1987 | Lakin | | 384/206 |
| 4,800,309 A * | 1/1989 | Lakin | | 310/90 |
| 4,887,916 A * | 12/1989 | Adam et al. | | 384/192 |
| 4,900,165 A * | 2/1990 | Kun et al. | | 384/220 |
| 5,140,856 A * | 8/1992 | Larsen | | 73/455 |
| 5,178,518 A * | 1/1993 | Carter, Sr. | | 416/11 |
| 5,277,500 A * | 1/1994 | Keck | | 384/204 |
| 5,308,224 A * | 5/1994 | Olivero et al. | | 415/53.1 |
| 6,183,136 B1 * | 2/2001 | Dingman | | 384/204 |
| 6,247,223 B1 * | 6/2001 | Keck | | 29/596 |
| 6,750,559 B2 * | 6/2004 | Becker | | 290/55 |
| 6,879,055 B2 * | 4/2005 | Becker et al. | | 290/55 |
| 7,210,716 B2 * | 5/2007 | Mueller et al. | | 292/336.3 |
| 7,306,059 B2 * | 12/2007 | Ide | | 175/107 |
| 7,385,305 B2 * | 6/2008 | Casazza et al. | | 290/55 |
| 7,550,863 B2 * | 6/2009 | Versteegh | | 290/44 |
| 7,552,782 B1 * | 6/2009 | Sexton et al. | | 175/107 |
| 2003/0071469 A1 * | 4/2003 | Becker | | 290/55 |
| 2003/0080566 A1 * | 5/2003 | Becker et al. | | 290/55 |
| 2005/0280266 A1 * | 12/2005 | Mueller et al. | | 292/336.3 |
| 2006/0278439 A1 * | 12/2006 | Ide | | 175/107 |
| 2007/0081749 A1 * | 4/2007 | Sexton et al. | | 384/420 |
| 2007/0217903 A1 * | 9/2007 | Thamboo et al. | | 415/110 |
| 2007/0222226 A1 * | 9/2007 | Casazza et al. | | 290/55 |
| 2007/0248293 A1 * | 10/2007 | Pettinato et al. | | 384/99 |
| 2008/0115976 A1 * | 5/2008 | Ide | | 175/104 |
| 2008/0272604 A1 * | 11/2008 | Versteegh | | 290/55 |
| 2008/0315594 A1 * | 12/2008 | Casazza et al. | | 290/55 |
| 2009/0110554 A1 * | 4/2009 | Dukovic et al. | | 416/41 |
| 2009/0268995 A1 * | 10/2009 | Ide et al. | | 384/121 |

FOREIGN PATENT DOCUMENTS

| | | |
|---|---|---|
| EP | 1 291 521 A1 | 9/2001 |
| EP | 1 359 321 A1 | 5/2003 |
| GB | 2 381 047 A | 4/2003 |
| WO | 2004/041407 A1 | 3/2004 |
| WO | WO 2006066686 A1 * | 6/2006 |

* cited by examiner

WIND MOTOR WITH A HOLDING DEVICE FOR A ROTOR SHAFT

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention relates to a wind motor with a drive, the input of which is coupled with a rotor shaft, wherein a separate mount is provided for the rotor shaft.

Erich Hau, Windkraftanlagen (Wind Power Plants), second revised and updated edition, Springer 1996, pages 242-247, the entire contents of which is incorporated herein by reference, describes different variants of the rotor mount. Thus, it is known to provide separate mounts for a long shaft. Furthermore, it is create a rotor mount completely in the drive or on a standing, hollow axis. The rear mount can also be integrated into the drive and the front mount can be designed as a separate mount. The separate mount for the rotor shaft can be integrated with a special mount base in the machine house or in a load-supporting power-house front wall. The last named mount types are also called three-point mounting, wherein the front mounting of the rotor shaft forms the main or rotor mount and the rear mounting is taken over by the drive, which in turn is supported laterally (left and right) on the machine support. The rotor, consisting of the rotor hub and the rotor blades, is connected with the rotor shaft and thus with the drive train and is carried by it. When working on the drive train, for which the drive must be disassembled, the rotor must also be disassembled together with drive train in the case of known wind power plants. This is associated with considerable effort.

EP 1 291 521 A1, the entire contents of which are incorporated herein by reference, suggests to screw the rotor hub with the machine support or the front wall of the machine house so that the rotor can remain on the wind motor while the drive is repaired and lifted out of the machine house.

A holding device for the rotor shaft when there is no support of the rotor shaft by the drive is known from Powerful News, a newsletter from NEG Micon A/S, August 2000, page 4, right column, the entire contents of which are incorporated herein by reference. The holding device has a bridge spanning the rotor shaft, which is connected with the machine support on its outer ends. The bridge is screwed with the machine mount in the mounted state and has in the middle area a recess, which accepts the rotor shaft. If the drive is disassembled, the rotor shaft is loaded by the rotor and tries to tip upwards via the separate mount. The rotor shaft is held down in its position by the holding bridge connected with the machine support.

A device for drive exchange in the case of a wind power plant is known from the post-published European patent application EP 1 617 075 A1, the entire contents of which are incorporated herein by reference. This device also uses a yoke, which has a bay for the installation of the rotor shaft. The bay is closed via a clamp, which clamps the rotor shaft firmly against the bay.

The object of the invention is to develop an option for easily performing work on the drive in a wind motor without having to disassemble the entire drive train.

BRIEF SUMMARY OF THE INVENTION

The wind motor according to the invention has a drive, the input shaft of which is coupled with a rotor shaft. The rotor shaft is held by a separate rotor mount, wherein the rear mount is integrated into the drive. A holding device, which holds the rotor shaft in a predetermined position if there is no support of the rotor shaft by the drive, is provided between the separate mount and the drive. The holding device according to the invention assumes in this case the support of the rotor shaft so that the drive can be uncoupled from the rotor shaft. The holding device preferably has a holding frame, which is provided with a machine support for a detachable connection. In its mounted position, the rotor shaft spans the holding frame. Furthermore, the holding device preferably has two jaws, which encompass the rotor shaft in a mounted position. The holding device is also provided with clamping elements, each of which can be clamped between a jaw and the holding frame, in order to hold the jaws on the holding frame. Two clamping elements are preferably provided for each jaw. In a preferred embodiment, the jaws of the holding device are placed around the rotor shaft, connected with each other and connected with the holding frame via the clamping elements. Below, the holding frame is mounted on the machine support in a position spanning the rotor shaft.

The machine support preferably also supports the drive as well as the separate mount of the rotor shaft.

In a preferred further embodiment of the holding device according to the invention, a pressure ring is provided, which—connected with the holding device—exerts a force in the axial direction, in order to decouple the rotor shaft from the input of the drive.

BRIEF DESCRIPTION OF THE SEVERAL VIEWS OF THE DRAWINGS

A preferred exemplary embodiment of the holding device according to the invention is described in greater detail below.

DETAILED DESCRIPTION OF THE INVENTION

Figure 1:
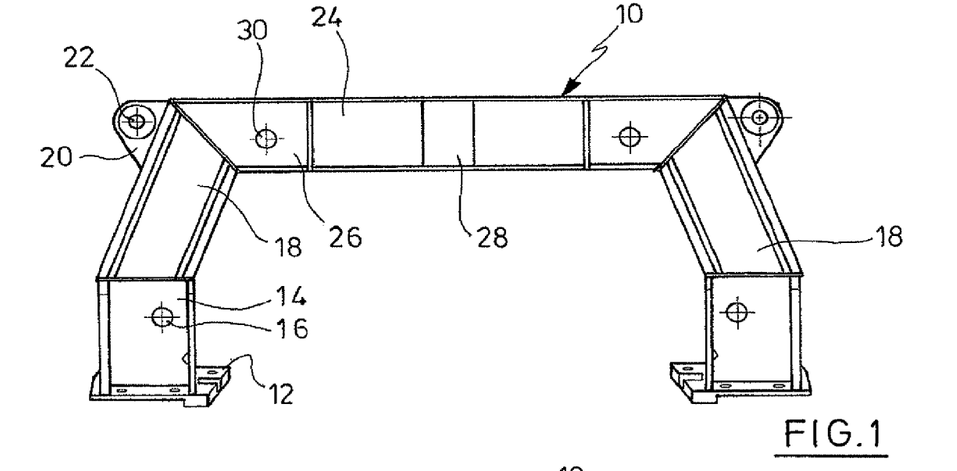
FIG. 1 shows a view of the support frame from the front.

While this invention may be embodied in many different forms, there are described in detail herein a specific preferred embodiment of the invention. This description is an exemplification of the principles of the invention and is not intended to limit the invention to the particular embodiment illustrated FIG. 1 shows a support frame 10, which has mounting plates 12 on its ends. Several profile sections extend from the mounting plates. A first profile section 14 is designed as a double T-profile and has a bore hole 16. The first profile section 14 is followed by a second profile section 18, which is tilted with respect to the first profile section. The second profile section 18 has a stop eyelet 20 with a central bore hole 22 on the side facing outward. The second profile support is then followed by a middle support profile 24, which is connected with two support profiles 18 on both sides. The middle support profile 24 has two edge sections 26, which are separated by a central middle area 28. The lateral areas 26 are provided with bore holes 30. The middle support 24 is designed reinforced for stabilization in particular in its central area 28, in that the double T-profile is also provided with a wall laterally (see FIG. 9).

Figure 2:
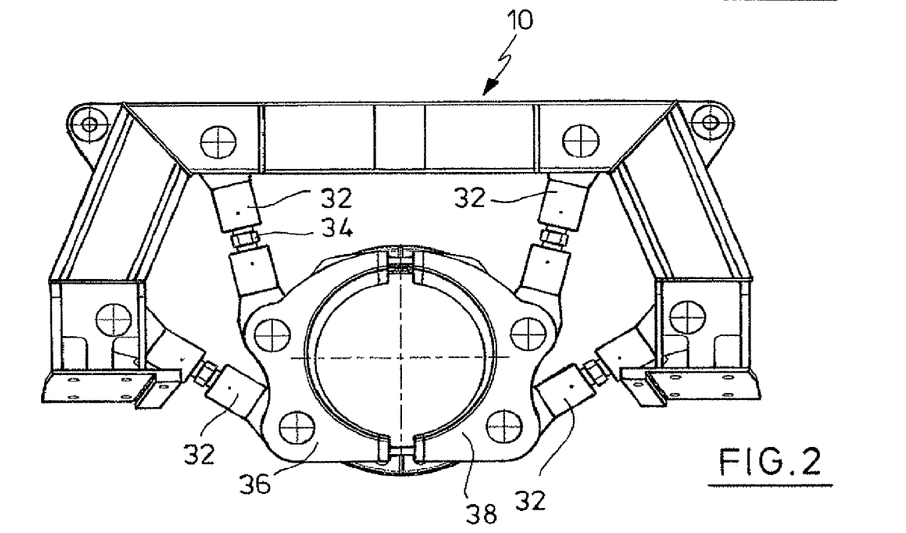
FIG. 2 shows the support frame from FIG. 1 in a view from the front with deployed holding jaws.

FIG. 2 shows the support frame 10 with four applied clamping elements 32, which are held in the bore holes 16 and 30. The length of the clamping elements 32 can in turn be adjusted via a central element 34. As can be seen in FIG. 2, the clamping elements 32 are each connected pairwise with the jaw element 36, 38. As will be explained in greater detail below, the jaw elements 36, 38 encompass the rotor shaft.

Figure 3:
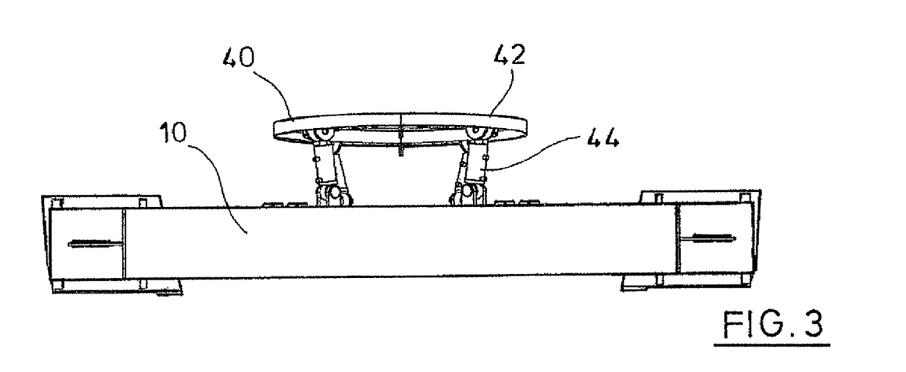
FIG. 3 shows the support frame from above with the pressure ring in front.

It can be seen in the view from above in FIG. 3 that a pressure ring 40, 42 can be placed in front of the support frame 10, which is connected with the holding jaws 36 and 38 via lifting element 44.

Figure 4:
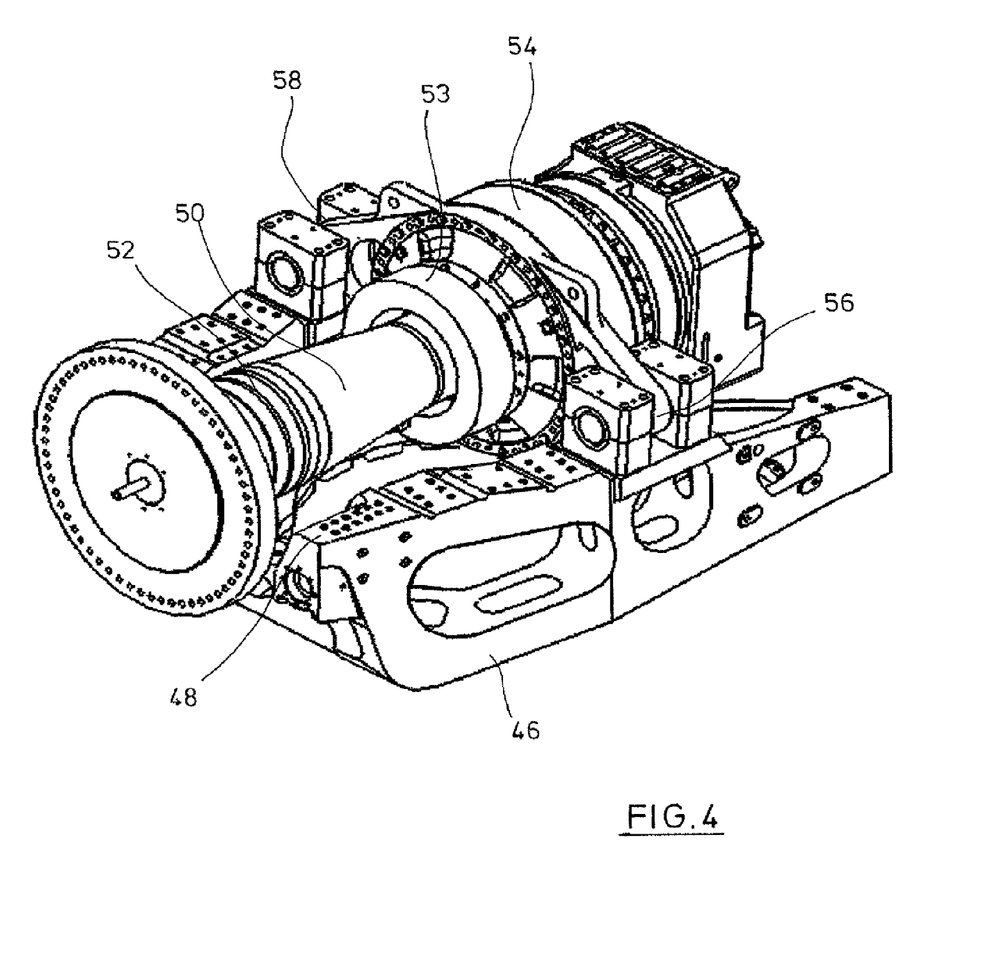
FIG. 4 shows a perspective view of the machine support with rotor shaft and drive.

FIGS. 4-9 illustrate below the installation process and clarify the functionality of the holding device. FIG. 4 shows a perspective view from the front of a machine support 46, as it is used in a wind motor with a three-point mounting. The main mount is not shown for a better overview. The main mount is supported on the machine support 46 in area 48 and supports the rotor shaft 50 in area 52. This mounting is called a three-point mounting, since, in addition to the main mount, which mounts the rotor shaft 50 in 52, the drive 54 is supported with the integrated mount in 56 and 58. In the case of damage to the drive or maintenance work on the drive, it was in the past often necessary to disassemble the drive together with the rotor shaft 50, since there was no support for the rotor shaft 50 after removal of the drive 54. The rotor shaft 50 is connected with the drive 54 via a cone clamping element (shrink disk) 53. The arrows indicate the area, in which the holding device is connected with the machine support 46.

Figure 5:
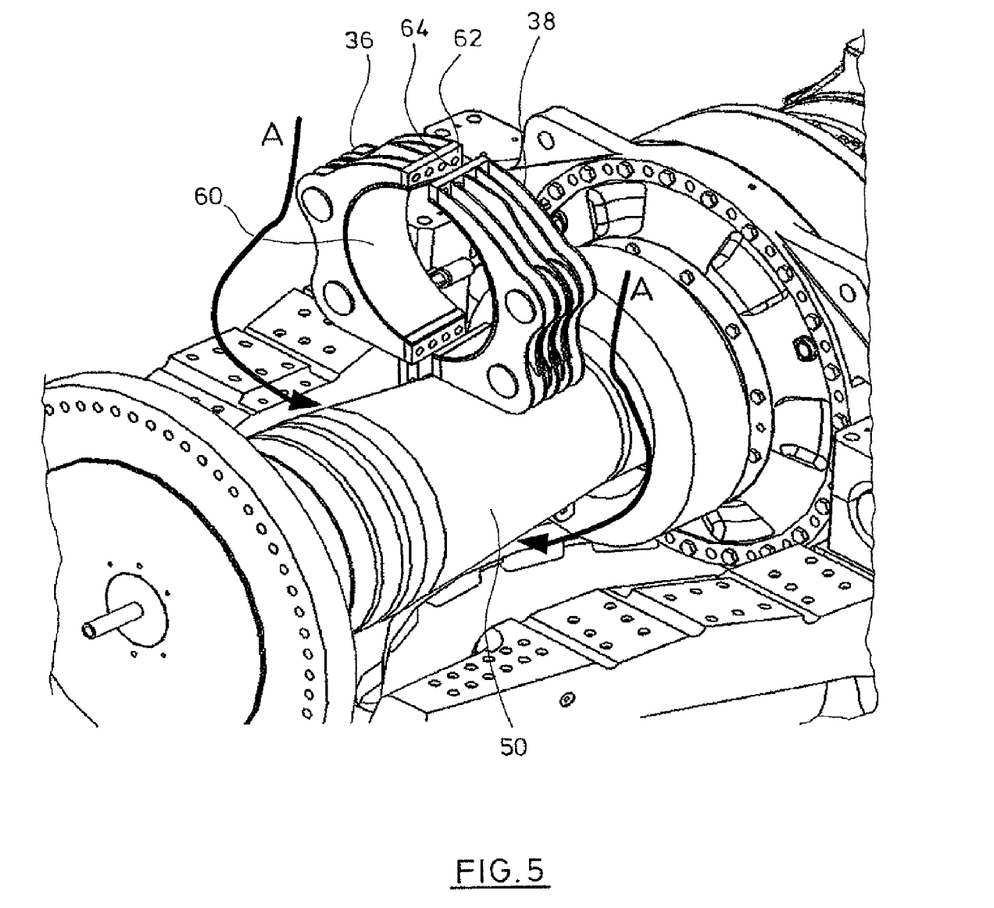
FIG. 5 shows an enlarged view from FIG. 4 with holding jaws to be applied.
Figure 6:
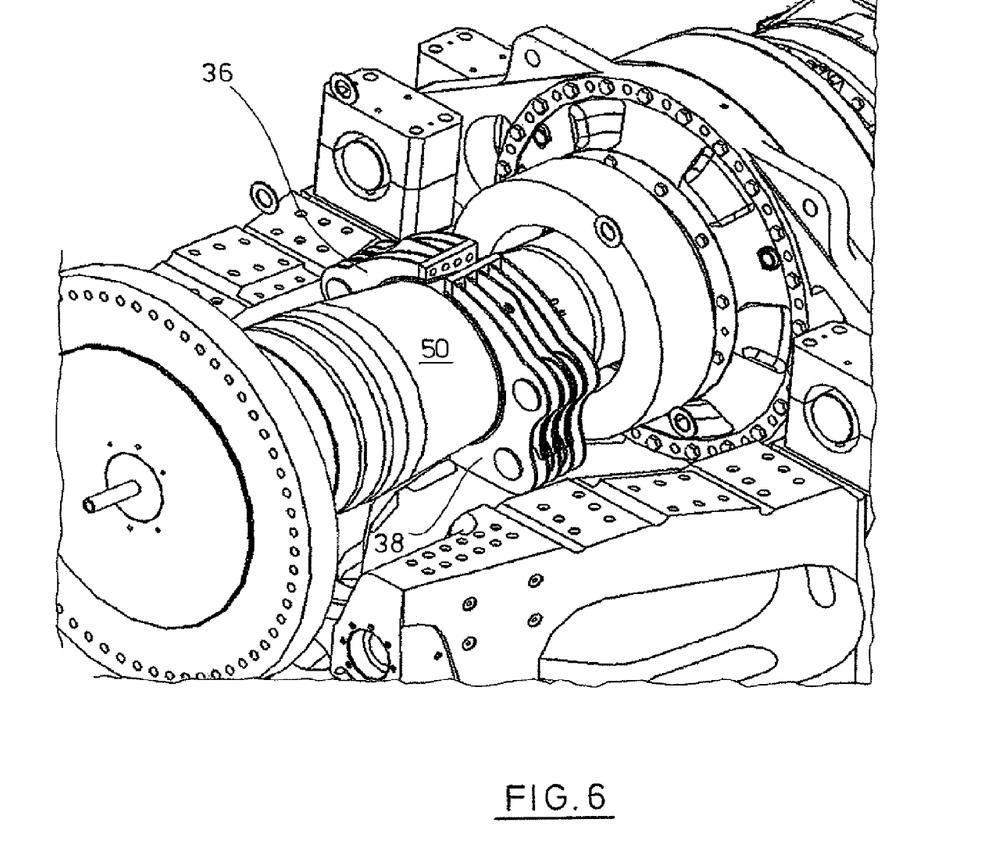
FIG. 6 shows a view from FIG. 5 with applied holding jaws.

FIG. 5 shows how the holding jaws 36 and 38 are lowered and, as indicated by the arrows A, how the rotor shaft 50 is encompassed. As shown in FIGS. 5 and 6, the holding jaws consist of parallel disks, which support a holding surface 60 modified for the geometry of the rotor shaft 50. Furthermore, each holding jaw 36 or 38 has on its front sides contact surfaces 62, which are provided with bore holes 64. In order to mount the holding jaws 36 and 38 together, they can be connected with each other on the front by bolts.

Figure 7:
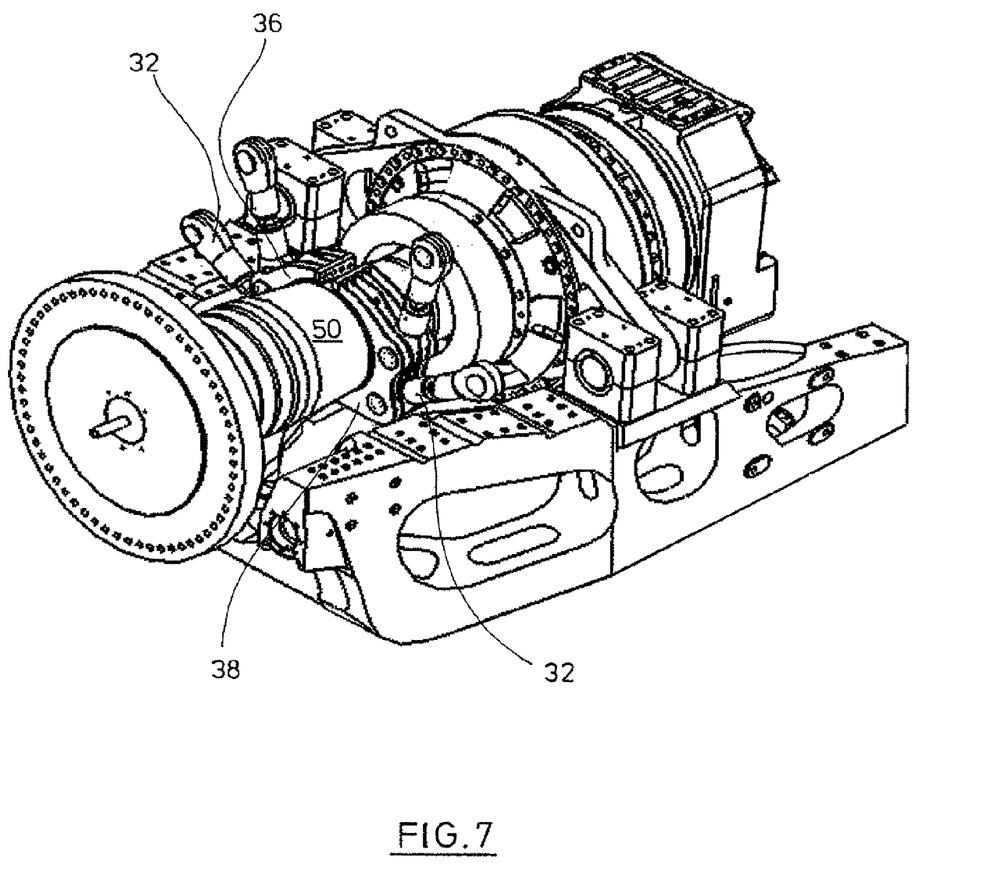
FIG. 7 shows applied holding jaws with clamping elements.

FIG. 6 shows the attached holding jaws 36 and 38 in the unconnected state. FIG. 7 shows the holding jaws 36 and 38 with applied clamping elements 32. With respect to the installation process, it is self-evident that the holding jaws 36 and 38 can also be placed on the rotor shaft 50 with already pre-mounted clamping elements 32.

Figure 8:
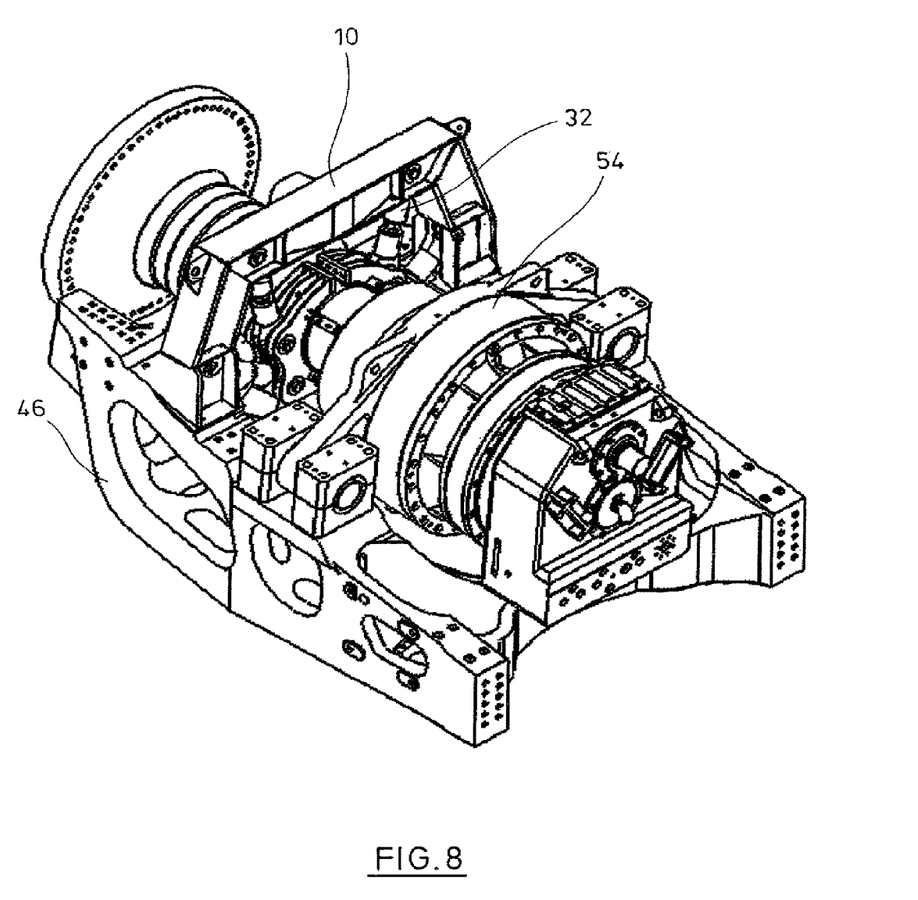
FIG. 8 shows applied holding jaws with clamping elements and attached support frame.

FIG. 8 shows below how the support frame 10 is lowered onto the machine support 46. The support frame 10 is screwed with the machine support 46 and the clamping element 32 is used and clamped in order to hold the rotor shaft. The support frame can also consist of several parts, which are lifted separately into the machine house of the wind motor, and are only mounted to together afterwards.

The mounted support frame shown as in FIG. 8 with the holding jaws 36 and 38 holds the rotor shaft if the drive 54 is uncoupled from it.

Figure 9:
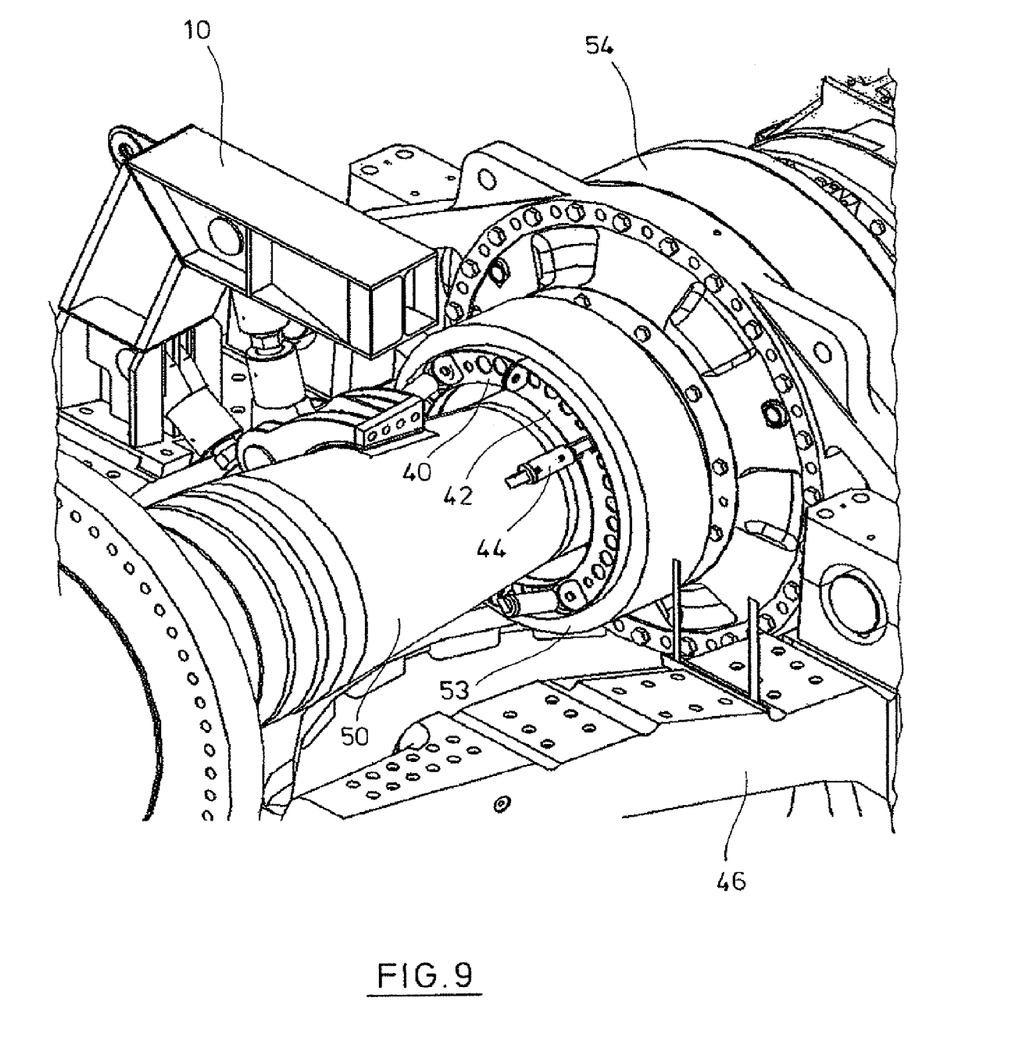
FIG. 9 shows the support frame and jaws partially cut with prepared pressure ring.

In FIG. 9, the mounted holding device is shown partially cut in order to enable the view of the drive 54 with the cone clamping element 53 and the pressure ring 40, 42 with the elements 44. In order to be able to separate the drive 54 from the rotor shaft 53, the cone clamping element (shrink disk) 53 clamped by means of screws must be released. The pressure ring 40, 42 is attached and connected with the holding device via lifting elements 44. The lifting elements are advantageously designed as hydraulic cylinders, but other embodiments are also conceivable. The lifting elements 44 connected with the holding jaws 36, 38 push the drive 54 including the cone clamping element 53 from the rotor shaft 50. The rotor shaft 50 is designed conically, whereby when pushing down the drive 54 including the cone clamping element 53 the "counter holding" is supported by the jaws 36, 38 of the holding device.

Figure 10:
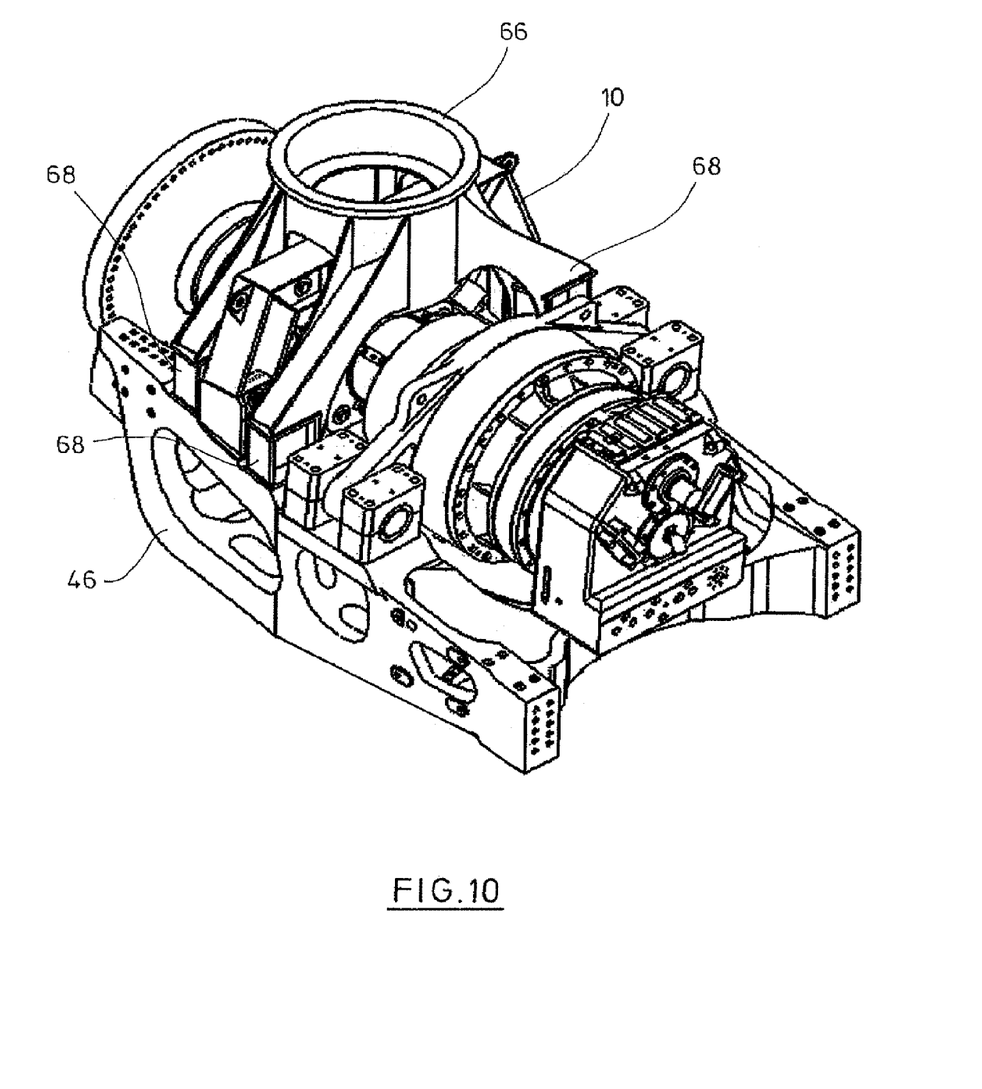
FIG. 10 shows the machine support with attached crane foot in a perspective view diagonally from the top and FIG. 11 shows the machine support with attached crane foot in a view from the side.
Figure 11:
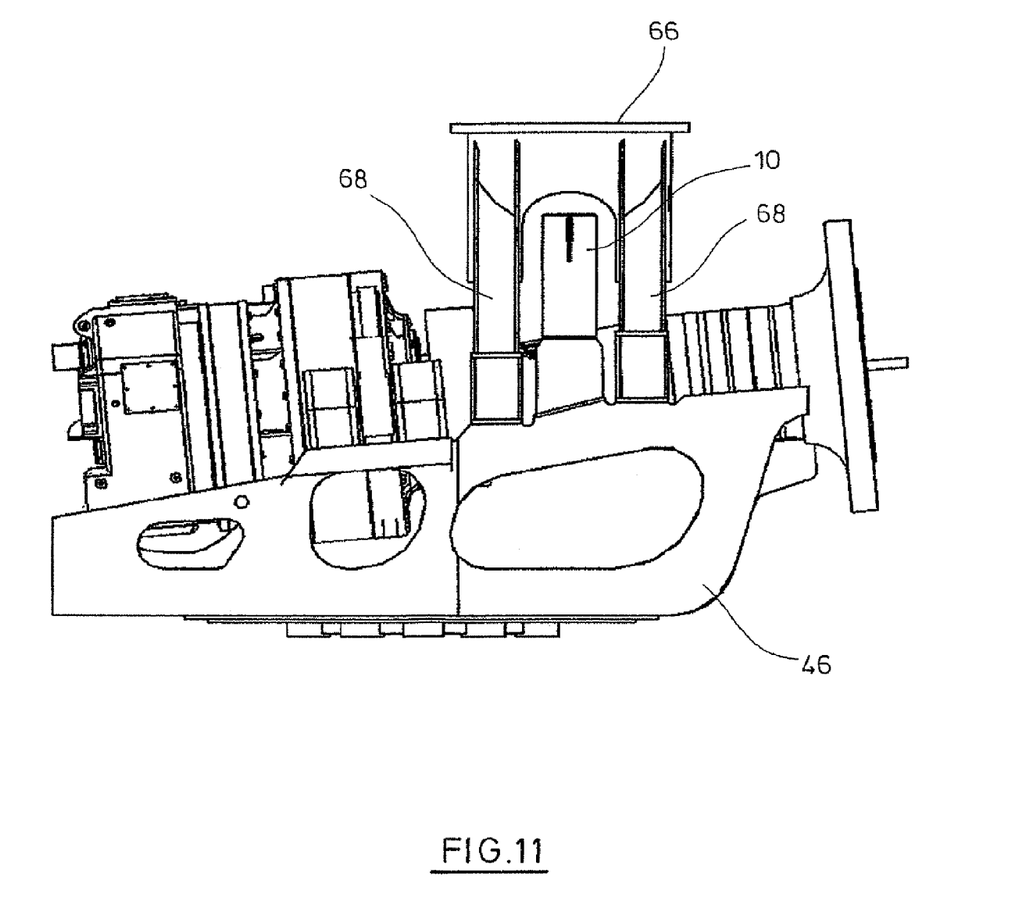

FIGS. 10 and 1 also show a crane foot 66, which is fastened on the machine support 46. The crane foot 66 has four legs 68, each of which are connected with the machine support 46. Between each pair of legs 68, the crane foot 66 has a recess, which allows the crane foot 66 to be placed when the holding frame 10 is mounted. This makes it possible to lift and lower loads with a crane placed separately onto the machine support 46 in the case of attached support frame 10.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. Wind motor with a drive (54), the input of which is coupled with a rotor shaft (50), which has a separate mount, wherein a holding device (10), which in its mounted state holds the rotor shaft in a predetermined position, is provided between the mount and the drive, when there is no support of the rotor shaft by the drive, characterized in that the holding device has the following: jaws (36, 38), which in the mounted position encompass the rotor shaft (50), a holding frame (10), which in the mounted position spans the rotor shaft, and at least one clamping element (32) per jaw, which is clamped between the jaw and the holding frame.

2. Wind motor according to claim 1, characterized in that the holding device is connected in a detachable manner with a machine support (46).

3. Wind motor according to claim 1, characterized in that two clamping elements (32) are provided for each jaw (36, 38).

4. Wind motor according to claim 1, characterized in that the machine support (46) supports the drive (54).

5. Wind motor according claim 1, characterized in that the machine support (46) supports the mount of the rotor shaft (50).

6. Wind motor according to claim 1, characterized in that a pressure ring (40, 42) is also provided, which is connected with the holding device and exerts a force in the axial direction of the rotor shaft, in order to couple the rotor shaft (50) from the input of the drive (54).

* * * * *